(12) United States Patent
Curran

(10) Patent No.: US 9,193,612 B2
(45) Date of Patent: Nov. 24, 2015

(54) CONCENTRIC LAYER ELECTRIC DOUBLE LAYER CAPACITOR CYLINDER, SYSTEM, AND METHOD OF USE

(71) Applicant: Patrick Michael Curran, Laguna Niguel, CA (US)

(72) Inventor: Patrick Michael Curran, Laguna Niguel, CA (US)

(*) Notice: Subject to any disclaimer, the term of this patent is extended or adjusted under 35 U.S.C. 154(b) by 0 days.

(21) Appl. No.: 14/152,918

(22) Filed: Jan. 10, 2014

(65) Prior Publication Data

US 2014/0190838 A1  Jul. 10, 2014

Related U.S. Application Data

(63) Continuation of application No. 12/807,540, filed on Sep. 8, 2010, now abandoned.

(60) Provisional application No. 61/276,019, filed on Sep. 8, 2009.

(51) Int. Cl.
| | |
|---|---|
| C02F 1/469 | (2006.01) |
| H01G 11/32 | (2013.01) |
| H01G 11/52 | (2013.01) |
| C02F 1/461 | (2006.01) |

(52) U.S. Cl.
CPC ............ *C02F 1/4691* (2013.01); *C02F 1/46104* (2013.01); *H01G 11/32* (2013.01); *H01G 11/52* (2013.01); *C02F 2001/46133* (2013.01); *C02F 2001/46152* (2013.01); *C02F 2001/46171* (2013.01); *C02F 2201/003* (2013.01); *C02F 2201/4611* (2013.01); *C02F 2201/46115* (2013.01); *Y02E 60/13* (2013.01); *Y02T 10/7022* (2013.01); *Y02W 10/37* (2015.05)

(58) Field of Classification Search
CPC ................ C02F 2001/46171; C02F 2201/003; C02F 1/4691; H01G 11/52
USPC .................. 204/627, 630, 660, 666, 670, 671
See application file for complete search history.

(56) References Cited

U.S. PATENT DOCUMENTS

| | | | |
|---|---|---|---|
| 5,192,432 | A | 3/1993 | Andelman |
| 5,196,115 | A | 3/1993 | Andelman |
| 5,415,768 | A | 5/1995 | Andelman |
| 5,425,858 | A | 6/1995 | Farmer |
| 5,538,611 | A | 7/1996 | Otowa |
| 5,620,597 | A | 4/1997 | Andelman |
| 5,748,437 | A | 5/1998 | Andelman |
| 5,779,891 | A | 7/1998 | Andelman |
| 5,954,937 | A | 9/1999 | Farmer |
| 6,309,532 | B1 | 10/2001 | Tran et al. |
| 6,346,187 | B1 | 2/2002 | Tran et al. |

(Continued)

OTHER PUBLICATIONS

Kuran, S., et al., "Flow Through Capacitor Technology", The International Workshop on Marine Pollution and the Impact of Seawater Desalination Plants on the Coastal Environment, Dubai, UAE, Dec. 1-3, 2003, pp. 1-15.

*Primary Examiner* — Keith Hendricks
*Assistant Examiner* — Steven A. Friday
(74) *Attorney, Agent, or Firm* — One LLP

(57) ABSTRACT

This invention relates to an electric double layer capacitor electrochemical cylinder (11) made up of concentric layers of capacitors (16), current collectors (14a, 14b, 14c), ion specific membranes (18, 18a, 18b) and dielectric spacer (20) wrapped around an inner support tube (12) that can be used as a high capacitance capacitor and to remove dissolved solids from a liquid stream such as water, acid, aqueous or nonaqueous.

1 Claim, 5 Drawing Sheets

(56) References Cited

U.S. PATENT DOCUMENTS

Figure 1:
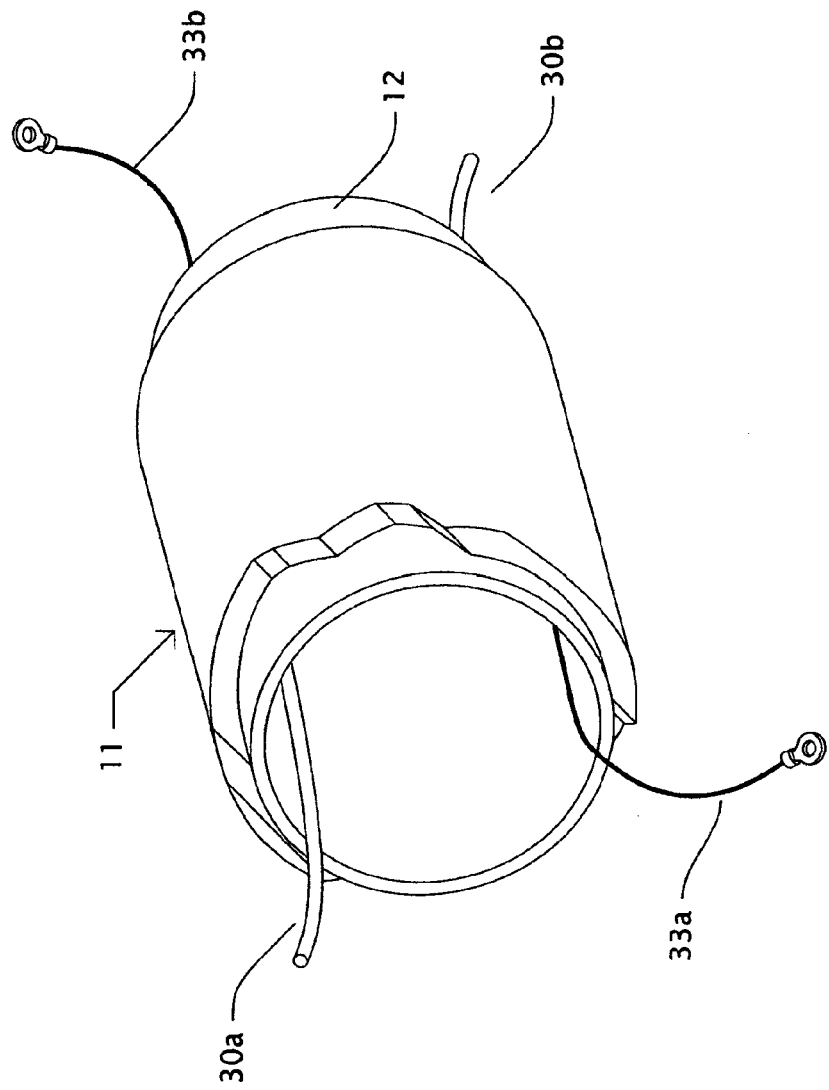

| | | |
|---|---|---|
| 6,413,409 B1 | 7/2002 | Otowa et al. |
| 6,628,505 B1 | 9/2003 | Andelman |
| 6,761,809 B2 | 7/2004 | Tran et al. |
| 7,368,191 B2 | 5/2008 | Andelman et al. |
| 2005/0103634 A1 | 5/2005 | Andelman et al. |
| 2006/0049105 A1* | 3/2006 | Max .............................. 210/650 |
| 2007/0053141 A1 | 3/2007 | Fujino |
| 2007/0158185 A1 | 7/2007 | Andelman et al. |
| 2008/0078673 A1 | 4/2008 | Elson et al. |
| 2009/0218227 A1* | 9/2009 | Noh et al. ..................... 204/666 |
| 2010/0102009 A1* | 4/2010 | Silva ........................ 210/748.01 |

* cited by examiner

CONCENTRIC LAYER ELECTRIC DOUBLE LAYER CAPACITOR CYLINDER, SYSTEM, AND METHOD OF USE

CROSS-REFERENCE TO RELATED APPLICATIONS

This application claims the benefit of provisional patent application Ser. No. 61/276,019 filed 2009 Sep. 8 by the present inventor.

FEDERALLY SPONSORED RESEARCH

Not applicable

SEQUENCE LISTING OR PROGRAM

Not applicable

BACKGROUND OF INVENTION

1. Field of Invention

This invention relates to an electric double layer capacitor constructed of a plurality of concentric rings of capacitor pairs for use as an electrochemical device for energy storage or deionization of liquids 2. Prior Art The following tabulation of some prior art that presently appears relevant:

US PATENTS

U.S. Pat. No. 5,196,115 to Andelman, 1993 Mar. 23
U.S. Pat. No. 5,415,768 to Andelman, 1995 May 16
U.S. Pat. No. 5,620,597 to Andelman, 1997 Apr. 15
U.S. Pat. No. 5,748,437 to Andelman, 1998 May 5
U.S. Pat. No. 5,779,891 to Andelman, 1998 Jul. 14
U.S. Pat. No. 5,425,858 to Andelman, 1995 Jun. 20
U.S. Pat. No. 5,538,611 to Andelman, 1996 Jun. 23
U.S. Pat. No. 5,954,937 to Farmer, 1999 Sep. 21
U.S. Pat. No. 5,309,532 B1 to Tran et al., 2001 Oct. 30
U.S. Pat. No. 6,336,187 B1 to Tran et al., 2002 Feb. 12
U.S. Pat. No. 6,413,409 B1 to Andelman, 2002 Jul. 2
U.S. Pat. No. 6,628,505 B1 to Andelman, 2003 Sep. 30
U.S. Pat. No. 6,761,809 A1 to Tran et al., 2002 Jul. 4
U.S. Pat. No. 7,368,191 B2 to Andelman et al., 2003 Sep. 30

PUBLICATIONS

International Forum on Marine Pollution, Dec. 1-3, 2003

Deionizing liquid streams, and in particular aqueous streams, has very significant importance in the world today. An increasing portion of the fresh water supply for the world is coming from desalination plants that are current operated with reverse osmosis systems. These systems require a tremendous amount of energy, high maintenance due to the extreme operating pressures, and chemicals to remove fouling from the reverse osmosis cylinders. Other large opportunities for deionizing water are industrial softening for water towers, processing of water by-products from the oil and gas industry, and residential water softening. These opportunities are current being addressed through ion exchange with resins or sodium chloride and standard waste water treatment precipitation.

Capacitive deionization devices have been developed over the last 20 years as a possible replacement for the existing methods. Capacitive deionization in general has the ability to remove ions with lower energy and minimal fouling. Unfortunately, the devices produced and patented suffer from a number of limitations listed below.

Capacitive deionization works as follows. An aqueous stream containing undesirable ions is fed into a device containing one or more pairs of electric double layer capacitors. A power supply is attached to the pairs and the capacitors are charged. Since there is a dielectric material or layer in between the layers, they hold their charge just like a standard capacitor.

When charged "positively", the cations and anions are removed from solution and adsorbed onto a capacitor which is typically made of carbon. The carbon capacitors, or capacitors, eventually fill with ions. When this occurs, the polarity of the double layer capacitor is switched and the ions are ejected from the surface of the carbon into the stream and carried out of the device.

Unfortunately, the timing and space constraints of existing devices do not allow for a clean separation between the cleaned stream and the following concentrated stream. Because these two streams partially mix together, the purification ability of the device is limited.

Current capacitive deionization devices have significant limitations for performance due to the design constraints employed. In all cases, the devices are difficult to assemble, suffer from the effect of large dead volume spaces within the devices, and other performance limiting issues which will be described in detail below.

In U.S. Pat. No. 5,192,432 to Andelman, 1993 Mar. 9, had a spirally wound electric double layer capacitor with no charge barrier and a large internally exit tube that allowed for mixing of the cleaned and dirty streams. The lack of the charge barrier allows discharged ions to re-adsorb onto the opposing capacitor and the large exit tube volume allows for mixing of the cleaned and dirty process streams. Also, the spirally wound design causes a large linear path for the water, which increases the residence time in the device and increases the difficulty of separating the clean from dirty process streams. The same issues are observed in the following spirally wound patents from Andelman.

U.S. Pat. No. 5,196,115 to Andelman, 1993 Mar. 23
U.S. Pat. No. 5,415,768 to Andelman, 1995 May 16
U.S. Pat. No. 5,620,597 to Andelman, 1997 April 15
U.S. Pat. No. 5,748,437 to Andelman, 1998 May 5
U.S. Pat. No. 5,779,891 to Andelman, 1998 Jul. 14

Another type of capacitive deionization device is the use of a flat plate design in which electric double layer capacitor pairs are stacked one on top of the other, creating a sandwich of one or more pairs. The flat plates can be circular as in U.S. Pat. No. 5,200,068 to Andelman, 1993 Apr. 6 and U.S. Pat. No. 5,360,540 to Andelman, 1994 Nov. 1. The flat plates can also be square or rectangular as in:

U.S. Pat. No. 5,425,858 to Andelman, 1995 Jun. 20
U.S. Pat. No. 5,538,611 to Andelman, 1996 Jun. 23
U.S. Pat. No. 5,954,937 to Farmer, 1999 Sep. 21
U.S. Pat. No. 5,309,532 B1 to Tran et al., 2001 Oct. 30
U.S. Pat. No. 6,336,187 B1 to Tran et al., 2002 Feb. 12
U.S. Pat. No. 6,413,409 B1 to Andelman, 2002 Jul. 2
U.S. Pat. No. 6,628,505 B1 to Andelman, 2003 Sep. 30
U.S. Pat. No. 6,761,809 A1 to Tran et al., 2002 Jul. 4
U.S. Pat. No. 7,368,191 B2 to Andelman et al., 2003 Sep. 30

In either case, both designs suffer from a large dead volume of space within the device where streams can be mixed during the change between purification and purging cycles. This limitation is discussed by Andelman in the attached publication presented to the International Workshop on Marine Pollution on Dec. 1-3, 2003 on page 11.

Because of the rigid casings of both the spiral and flat plate designs, it is difficult to adjust the performance parameters of the device. For example, it would be very difficult to add or subtract capacitor pairs from the flat plate design without changing the dimensions of the casing.

The common flat plate design also suffers from the inability to control the amperage draw of the capacitor thereby reducing the time window in which to separate clean from dirty streams.

These design issues prevent the current capacitive deionization devices from being operated in series allowing the water to pass from one to the next until an extremely clean stream emerges from the last cell. Storage tanks must be placed in between stages.

The existing capacitive deionization designs also suffer from precipitation of low solubility ions and must be periodically flushed with chemicals to remove the fouling. This is especially true with the flat plate design.

The existing designs also utilize a porous current collector which is difficult to assemble and imparts additional electrical resistance to the system.

The spirally wound design is difficult to assemble and has a large operating pressure drop through the device due to the tortuous path the liquid must follow. The capacitor pair must be continuously wrapped around the large perforated core without tears or gaps that the water could pass through unprocessed.

The flat plate design layers must be stacked individually until the desired height is reached. The alignment is critical at each end and in the center where the processed liquid exits. The compression under which the stack is compressed is difficult to control.

All cited capacitive deionization devices specify to operate at less than 1.5V. This reduced operating voltage lowers the potential capacity of the device by upwards of 30%.

Because of the design limitations, it is difficult to control the output concentration of the device which is the primary purpose of any deionizing system.

The amount of ions that can be adsorbed onto the surface of the carbon is exactly equal to the electrical capacitance of the capacitor in use. The current design of capacitors has a limited capacity due to the design and therefore limits the amount of ions that can be adsorbed in a given cycle and speed in which the ions are removed from solution.

Existing capacitive deionization devices have a circumference to length ratio of approximately 2.5. The radial design generally has a ratio closer to 0.25:1. This increased residence time allows for difficult ions to be removed by removing the easier ions in the first part of the device, leaving the harder to remove ions available only in the electromagnetic field.

Existing designs rely on a series of connections between poor conductivity materials and the power supply.

These and other advantages of one or more aspects will become apparent from a consideration of the ensuing description and accompanying drawings.

SUMMARY

This invention relates to a concentric layer electric double layer capacitor device, system design, and method of use. The concentric layer device solves many of the construction and performance issues observed with the existing prior art and provides advantages that allow the device to be used to purify very concentrated process streams such as but not limited to sea water and industrial waste streams.

DRAWINGS—FIGURES

FIG. 1: Isometric view of a concentric layer electric double layer capacitor cylinder 11.

Figure 2:
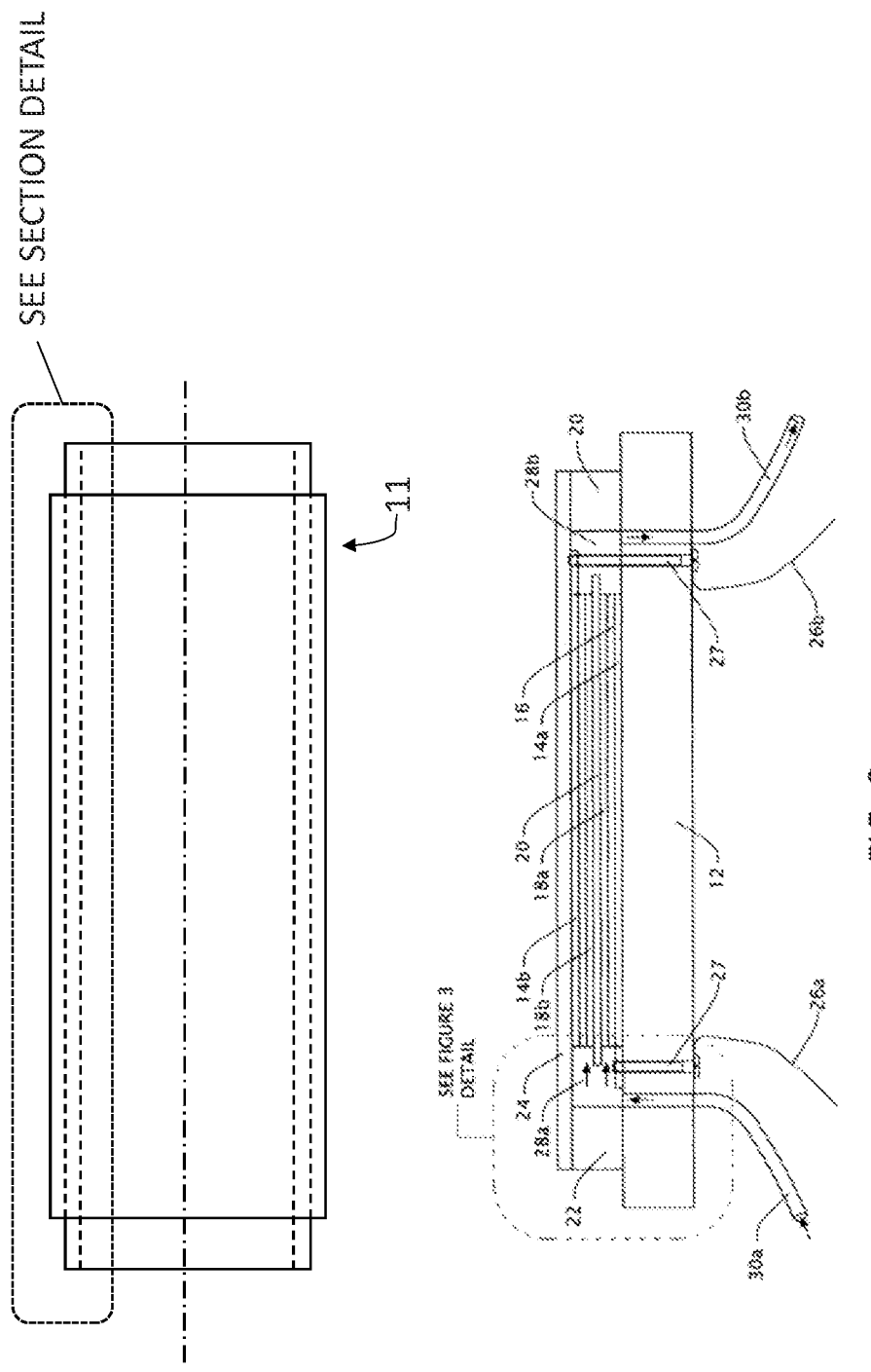

FIG. 2: Cross section of basic concentric layer EDLC cylinder 11.

Figure 3:
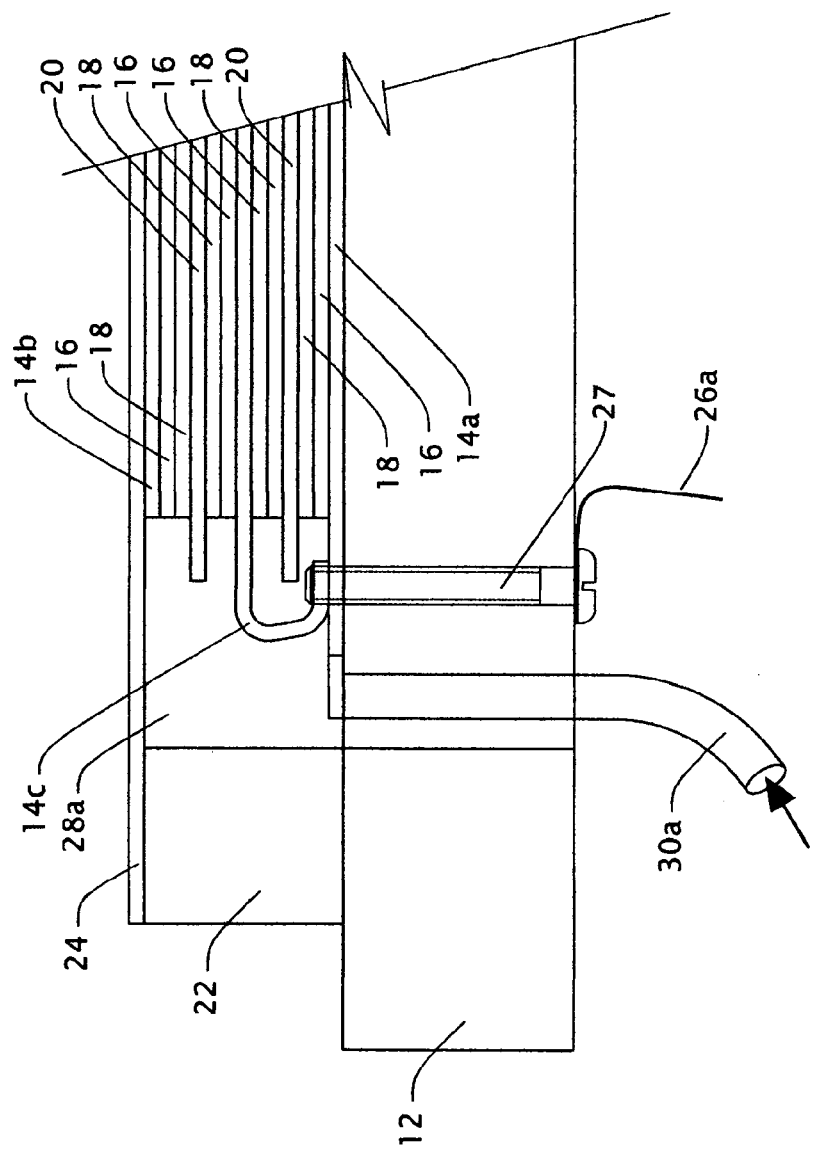

FIG. 3: Cross section of multiple pair concentric layer EDLC cylinder 11.

Figure 4:
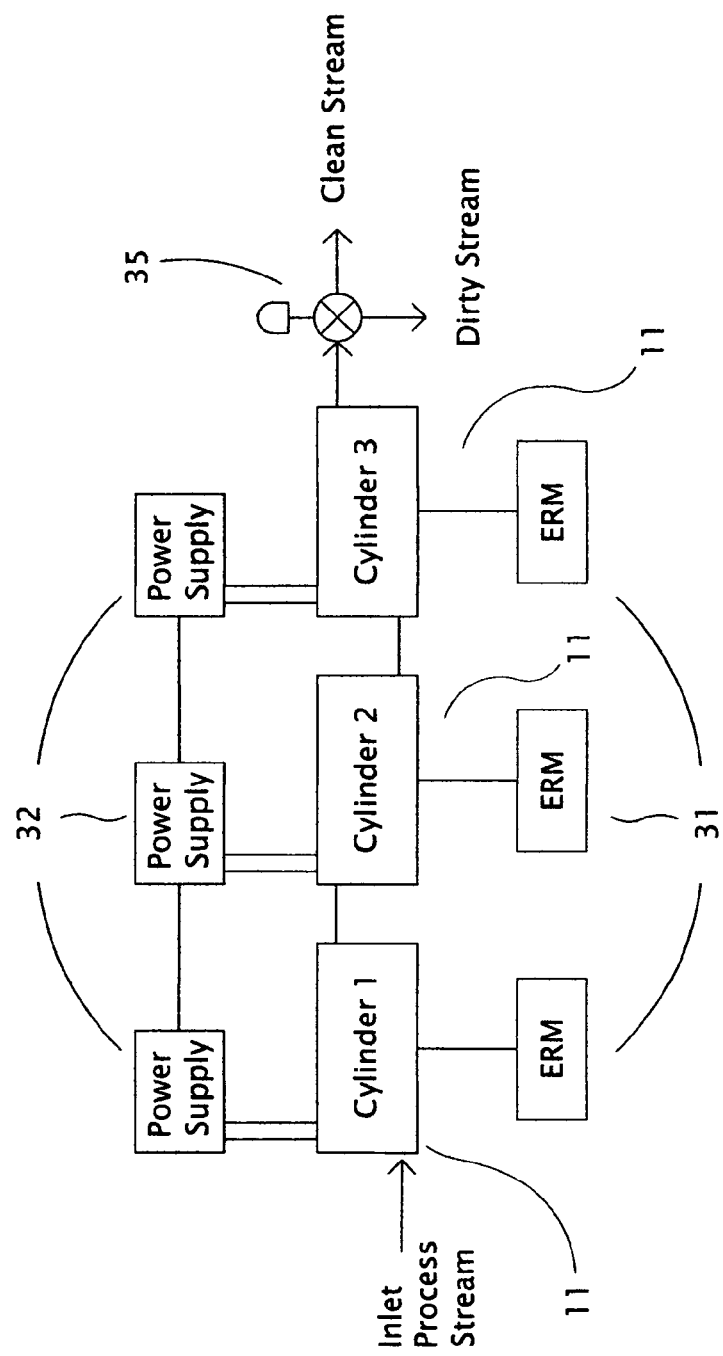

FIG. 4: Series connection of multiple concentric layer EDLC cylinders 11, energy recovery modules 31, and power supplies 32.

Figure 5:
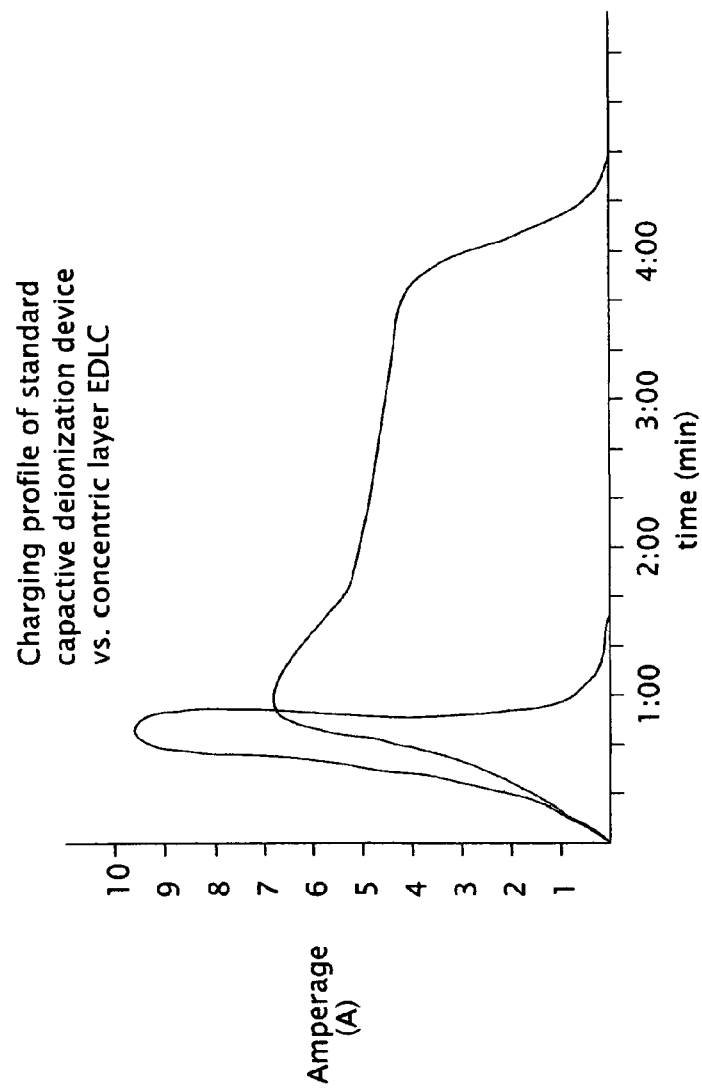

FIG. 5: Amperage profile of standard capacitive deionization device vs. concentric layer EDLC cylinder 11.

DRAWINGS—REFERENCE NUMERALS

11 Concentric layer electric double layer capacitor cylinder
12 Inner support tube
14a Inside current collector
14b Outside current collector
14c Within device current collector
16 Capacitor
18 Ion specific membrane
18a Ion specific membrane (anionic)
18b Ion specific membrane (cationic)
20 Dielectric spacer
22 O-ring
24 Outer casing/seal
26a Electrical lead
26b Electrical lead
27 Electrical lead post
28a Inlet liquid chamber
28b Outlet liquid chamber
30a Inlet liquid feed tube
30b Outlet liquid feed tube
31 Energy recovery module (ERM)
32 Power supply
33 Power supply leg 1
33b Power supply leg 2
35 way valve

DETAILED DESCRIPTION—FIGS. 1, 2, AND 3
FIRST EMBODIMENT

A basic concentric layer electric double layer capacitor (EDLC) cylinder 11, EDLC cylinder 11, or cylinder 11 consists of two or more tubular carbon electrodes or capacitors 16, one inserted inside of the other forming a concentric pair of capacitors 16. One pair of capacitors 16 forms an electric double layer capacitor 16 pair.

In the most basic design as shown in FIG. 1 and FIG. 2, an inner most capacitor 16 is wrapped around a current collector 14a, which could be hollow metallic tube (such as hastalloy, titanium, corrosion resistance steel, etc) or a non-metallic hollow tube 12 with a metallic coating, sleeve, or thin current collector 14a. Around this inner capacitor 16 could be an ionic membrane 18a or an ionic coating integrated onto a surface of capacitor 16. Next, a dielectric spacer, insulator, or spacer 20 would surround a capacitor 16 or membrane 18 which would allow for a liquid layer to flow through cylinder 11 as with standard capacitive deionization devices. Around this layer would be another ion selective membrane 18b, another capacitor 16, and then another current collector 14b.

Around perimeter of each end of hollow support tube 12 is an o-ring 22 to seal ends of cylinder 11. A sealing layer 24 wraps around cylinder 11, extending out to o-rings 22 which will completely seal cylinder 11 and provide means to compress layers within cylinder 11 securely against inner support tube 12.

Process liquid connections 30a and 30b to cylinder 11 will mount on inside of inner support tube 12 and allow for liquid access to inlet 28a and outlet chambers 28b. Electrical connections 26a and 26b to cylinder 11 are also made through inner surface of inner mounting tube 12.

FIG. 3 shows a concentric layer EDLC with a plurality of EDLC pairs. The structure of a multiple pair concentric layer EDLC is same as described in FIG. 2 except that an internal current collector 14c is placed onto second capacitor 16. On top of current collector 14c is placed another capacitor 16, another membrane 18, another dielectric spacer 20, another membrane 18, and then another capacitor 16. This sequence can be repeated until the desired number of pairs of capacitors 16b is installed onto inner mounting tube 12.

FIG. 4 shows multiple cylinders 11 connected in series for liquid processing. Outlet 30b of first cylinder 11 is immediately connected to inlet 30a of second cylinder 11, and so on. Each cylinder 11 is connected to an energy recovery module 31. Module 31 is used to capture energy released during the rejection of the stored ions in cylinder 11 for reuse on another cycle, another cylinder, or combination thereof.

Operation

When cylinder 11 is operating as a mega-capacitor, it is simply connected to the system of interest and used as an energy storage device such as an automobile. A typical commercially available large ultra-capacitor from Maxwell Technologies is 3,000 farads. A typical concentric EDLC cylinder 11 that is 12 inches long and 8 inches in diameter with 100 capacitor 16 pairs has an electrical capacitance of approximately 100,000 farads when operated at approximately 2 volts, or 33 times greater than the largest commercially available super-capacitor.

When cylinder 11 is operating as capacitive deionization device, liquid to be processed such as water enters cylinder 11 through inlet tube 30a into inlet chamber 28a. The liquid passes axially through spacer(s) 20, into outlet chamber 28b and then out of cylinder 11 through tube 30b.

Electrical leads 26a and 26b are connected to a direct current power supply (DC) 32. The simplest cylinder design with one EDLC pair has one capacitor 16 connected to one leg 33 of power supply 32 and capacitor 16 connected to leg 33b. Power supply 32 is turned on and each capacitor 16 is charged to the voltage set on power supply 32. In most cases, power supply 32 would be set to 2.2 volts when processing aqueous liquids.

If capacitor 16 nearest inner support tube 12 is charged positive it will attract negatively charged ions (anions). If membrane 18a proximal to this capacitor 16 is anionic, it will allow anions from the liquid in spacer 20 to pass through and adsorb onto capacitor 16. This adsorption will continue until the amount of ionic charge adsorbed onto capacitor 16 equals the charge capacity of capacitor 16. Conversely, capacitor 16 nearest outer casing 24 will be charged negative and attract positively charged ions (cations). If membrane 18b proximal to this capacitor 16 is cationic, it will allow cations to pass through until capacitor 16 is full.

Once capacitors 16 have adsorbed the prescribed amount of ions (partial or full adsorption), the polarity of power supply 32 is switched. Capacitor 16 that was charged positive is now switched to negative and other capacitor 16 is switched to positive. The ions that were adsorbed onto the surface are now repelled towards oppositely charged capacitor 16. Since opposite ion specific membranes are placed in front of each capacitor 16, the repelled ions can not pass through opposite membrane 18 and are prevented from adsorbing onto other capacitor 16. These rejected ions are held within spacer 20 and can be expelled from cylinder 11.

After all the ions have been dislodged from capacitors 16 and cylinder 11, the adsorption and rejection process can be repeated. If a 3 way valve is placed on outlet tube 30b, the deionized liquid can be diverted away from the liquid containing the rejected ions. Cylinder 11 power supply will switch the polarity back and forth, removing ions from solution and depositing the ions back into solution, creating a deionized portion and a portion containing the removed ions.

As mentioned previously, cylinder 11 is an energy storage device. When functioning as a capacitive deionization device and fully charged, a set amount of energy is being stored. When the polarity is switched, the voltage of one of capacitor 16 switches from, for example, +2.2 volts to −2.2 volts. The energy released when capacitor 16 voltage is changed from +2.2 volts to zero volts can be stored in energy storage or used to provide part of the energy for next cycle of cylinder 11. Management of this power will lower the energy consumption of cylinder by upwards of 50%. Energy recovery modules or ERM 31 as shown FIG. 4 are connected to cylinders 11 to support the energy management. Each ERM 31 can provide energy storage capacity to one or more cylinder 11.

Typical component sizes and materials of construction are as follows. The inner support tube 12 can be made of schedule 40 ABS pipe, PVC, PPE, PP, or the polymers with semi-rigid structure. The current collector 14a, 14b, or 14c is typically made of <0.005" commercial grade titanium. The carbon capacitor 16 is typically made of activated carbon, >0.005" thick, with surface area >2,000 m3/gm. The membranes 18a (anionic) and 18b (cationic) are commercially available from companies such as Ameridia. The spacer 20 can be made of many insulating materials such as hemp, nylon cloth, Tenyl, polypropylene, or other non-conductive materials that wet-out in water with open volume <75% and thickness >0.005". The o-rings 22 sealing each end can be made from Buna-n rubber, silicone, PTFE, or other flexible sealing materials.

With a 12 inch long, 8 inch diameter, single pair concentric EDLC, inlet 28a and outlet 28b chambers will be no bigger than 10 cm3 or 10 ml. A cylinder of this configuration would allow for flow of approximately 1,000 ml/min. This translates into a residence time or dead volume of less than 1 second. As additional pairs are added to cylinder 11 the dead volume will rise less than proportional, further reducing the residence time in chambers 28a and 28b. By reducing the residence time in outlet chamber 28a to less than 1 second, there is a clear delineation between cleaned and purged liquid streams when the polarity is switched.

Using the same 12 inch long and 8 inch diameter cylinder mentioned above, the residence time of the open space contained in spacer 20 is less than 2 seconds. The velocity of the liquid within spacer 20 has a Reynold's number greater than 2,000 thereby creating a great deal of turbulence which will facilitate the removal of ions after being ejected from capacitors 16 during the discharge cycle.

The combination of these two features significant reduces the effect of the problem of the clean stream being mixed with stream containing the rejected ions.

A charging concentric electric double layer capacitor cylinder generates a magnetic field adding inductance to the circuit. This inductance slows down the standard charging rate of capacitor 16, artificially increasing the RC time constant and greatly increasing the time to charge capacitor 16.

For a given size capacitor 16, the time to charge will be increased by a factor of 10, from 30 seconds to >4 minutes. The removal rate of ions during this extended cycle changes slowly, allowing for precise control of the liquid flow, further improving the ability to isolate clean streams from rejected.

The pressure drop across a standard 8 inch diameter by 12 inch cylinder with one EDLC pair of capacitors 16 and 1 liter per minute is less than 10 psi with a residence time of less than 5 seconds. This allows for cylinders to be placed in series to provide high levels of purification, including sea water and fracture water from oil and gas wells. By placing cylinders in series, the ratio of circumference to length can be adjusted without changing cylinder 16 itself. This flexibility allows for cylinders to be used in various combinations to process different streams with varying purification goals.

Current collectors 14a and 14b, or integrated capacitor 16/current collectors 14, are very close to inside and outside of the cylinder 11. This allows for simple and effective electrical connection to outside power source. A non-porous current collector is employed, thereby reducing the electrical resistance such as described above. When employing multiple EDLC pairs within cylinder 11, non porous collectors 14c are used to facilitate assembly and reduce electrical resistance.

FIG. 5 shows the charging speed of a standard capacitive deionization device versus the concentric layer electric double layer capacitor cylinder 11. Due to the concentric layer geometry, the current draw, charging speed, and molar flux during deionization are modulated and much more stable. The stable current draw allows for improved control of purification, facilitating the ability to separate clean from dirty process streams.

Additional embodiments

Winding tape or fiberglass-resin can be substituted as outer casing 24.

Inner support tube 12 can be 12 inches long and 6 inches in diameter and the axially length of the concentric layers 6 inches. 1-10 capacitor 16 pairs can be installed along with the respective number of membranes 18, current collectors 14a, 14b, 14c, and spacers 20.

The shape of inner support tube 12 could be oblong which could impart beneficial properties to the magnetic field.

The current collector 14a or 14b can be integrated with the capacitor 16 by plating carbon onto the current collector 14a, 14b or impregnating a mesh current collector 14a with a soft capacitor 16.

The capacitor 16 can be integrated with the membrane 16 by coating a liquid version of the membrane 16 onto the capacitor 14.

The current collector 14a, 14b, the capacitor 16, and the membrane 18 can be integrated together to form a monolithic structure.

Membranes 18 may be eliminated from the design when cylinder 11 is used as a mega-capacitor.

The thickness of the current collector 14a and 14b, the capacitor 16, and spacer 20 can be adjusted depending on the application and can also be varied within the same cylinder 11 for specific performance changes.

A protective rubber layer is placed around current collector 14. Another layer can be wound around cylinder 11, sealing the system and applying the appropriate pressure. Or the assembly can be placed into a compressible tube with a slot, around which clamps can compress the outer tube and its contents. Outer casing 24 could also be made from a conductive material such as a screen and allow for integration of the casing, current collector, capacitor 16, and membrane.

Another embodiment is the use of membranes 18a and 18b of the same polarity and cycle the polarity of the cylinder 11 as usual. This will allow for the removal of either cations or anions only. Charge balance will be maintained through generation of H+ and OH— by hydrolysis. One pertinent example of this is the cleaning of contaminated sulfuric acid. The cylinder 11 would be built with anion membranes 18a only. The sulfate ions will be removed. Then both capacitors 16 can be positively charged and the sulfate ions ejected. The first stream will contain the unwanted cations while the second stream will contain the sulfuric acid. This can also be done with cationic membranes 18b for the isolation of cations.

OBJECTS AND ADVANTAGES

Accordingly, several objects and advantages of our invention are:

a) The concentric layer electric double layer capacitor cylinder 11 design allows for a significantly reduced and exit dead volume/residence time within the device which reduces the effect of the mixing of clean and dirty water during cycle changes. This allows for very high TDS streams to be cleaned with a clear delineation between the clean and dirty streams.

b) The concentric layer design allows for easy adjustment of residence time of ions within the purification cell versus convention cell by adjusting the circumference to length ratio.

c) The concentric layer design allows for a wider operating window due to the modulated flow of current to the capacitor pairs thereby allowing for a more consistent exit concentration which is due to the magnetic field created with a circular capacitor.

d) Because of the above listed advantages, concentric layer devices can be arranged in series with water flowing from one to another which allows for larger degree of purification and eliminates the need for between cylinder 11 accumulation. This is much easier than constructing large, long devices and allows for system customization for each application.

e) The concentric layer design allows for reduced electrical resistance due to the ability to wrap each layer under tension.

f) The concentric layer design utilizes a non-porous current collector such as but not limited to stainless steel, titanium, platinum, gold plated steel, platinum plated titanium, plated plastic, etc.

g) The concentric layer format is easier to assemble and tolerant of material dimensional variability.

h) The number of radial concentric layer pairs of capacitors can be adjusted without changing the outer casing.

i) The concentric layer design allows for very large, economical mega-capacitors to be built for use in automobiles and other high energy applications.

j) One version of the concentric layer design incorporates the same-polarity membranes or coatings so as to selectively remove specific anions or cations such as the sulfate portion of sulfuric acid.

k) Re-precipitation of the rejected ions is eliminated by the short residence time and the magnetic field created by the concentric electric double layer capacitor which allows for the removal of difficult species with low solubility limits such as but not limited to barium, strontium, sulfates, and silicates.

l) The force under which the materials are compressed can be adjusted simply by adjusting the torque under which the outer casing is installed.
m) Operation of cylinders 11 at upwards of 2.2 volts or greater increasing the performance of the system without any detrimental effect on the integrity or performance of the cylinder 11.
n) Controlling of overall system through monitoring of cylinder 11 voltage, amperage draw, and instantaneous conductivity with specially designed algorithms.
o) The use of the system to remove unwanted ions from blood in place of traditional dialysis.
p) The use of the system to soften residential or commercial water without the use of chemicals for system fouling or salt.
q) A water feed bag made from solar cell material that can be hung such as to provide a slightly pressurized feed stream to a radial deionization system powered entirely by the solar bag cells.
r) Add booster capacitors in series or in parallel in order to increase capacitance of the concentric layer cylinder 11.
s) Use capacitor capacitors with dopants to boost the capacitance.
t) The capacitor pairs can be wired in parallel or series.
u) Because of the system design, the cylinder 11 systems require no chemicals for maintenance and cleaning
v) A low frequency AC power supply can be employed to simulate the polarity switching which consumes less power and is easier to operate and control.
w) By connecting an energy recovery module to the RDI system, the energy used to remove ions from solution can be saved and used to power other system components such as pump, system controls, and boost future cycles of the cylinders 11.
x) If an ionic membrane is used in between the capacitor 16 and spacer 20, it can be coated onto the surface of the carbon capacitor forming a monolithic capacitor/membrane via spray, doctor balding, etc
y) The contact resistance between the current collector and capacitor can be reduced by electroplating the collector prior to assembly with a highly conductive and corrosion resistant metal such as by not limited to platinum, gold, silver, and electro-less nickel.
z) A capacitor can be built up onto a current collector by co-plating carbon particles, ion selective beads, and/or metal onto the collector.
aa) Anionic or cationic nano-capacitors can be made by encapsulating highly salty conductive solution inside a polymeric bubble made up of either anionic or cationic selective materials. When the nano-capacitors are incorporated into the capacitor and inserted into an operating cylinder 11, the positive or negative ions will be ejected from the bubble creating a super nano capacitor.
bb) Employ membranes of the same polarity and cycle the polarity of the device as usual. This will allow for the removal of either cations or anions only.
cc) Use a layer of non-conductive particles to create the dielectric spacer.
dd) A completely integrated mesh current collector with carbon capacitor embedded into the mesh and an ion selective membrane polymer integrated onto the mesh carbon, forming a monolithic current collector, capacitor, membrane.
ee) Incorporate ion exchange beads or particles into the capacitor in order to increase the capacitance of the capacitor material.

Conclusion, Ramifications, and Scope

Thus the reader will see that at least one embodiment of the concentric layer electric double layer capacitor cylinder 11 provides a more effective and economical device for use as an energy storage and/or deionization device. The energy storage device can provide extremely large devices for use in electric cars and other high energy demand situations. The deionization cylinder 11 allows for the deionizing of high salinity process streams such as sea water using less energy, no chemicals, and more reliable technology than convention reverse osmosis systems. This will allow for further use of sea water as a source of drinking water.

A low energy, effective liquid deionizer will also allow for small solar power systems, facilitating the decentralization of world water supply.

There are numerous industrial water softening and other deionizing applications which have no effective solutions. For example, fracture water produced by oil and gas wells must be blended off in municipal water systems because the salinity level and low solubility of particular components prevents processing by standard methods such as reverse osmosis. One or more embodiments will allow for this water to be cleaned and reused, saving precious water. It will also allow for less chemicals to be used in the fracture process, reducing the effect of this gas extraction process on local water supplies.

While the above description contains many specificities, these should not be construed as limitations on the scope, but rather as an exemplification of one (or several) embodiment(s) thereof. Many other variations are possible. For example, the inner support tube could be solid and the liquids enter from either end, electrical and hydraulic connects could be made through the outside or ends of the cylinder 11.

Additional Configurations

Accordingly, the scope should be determined not by the embodiments illustrated, but by the appended claims and their legal equivalents.

The invention claimed is:

1. A method for deionizing aqueous streams, comprising:
pumping an aqueous stream through a concentric layer electric double layer capacitor elongated cylinder, the cylinder having a front end, a back end, an axis, a length and a diameter, wherein the cylinder comprises:
a plurality of concentrically opposed capacitor pairs positioned coaxially within the cylinder; and
a dielectric spacer interposed between at least one of said plurality of capacitor pairs, the dielectric spacer defining a passageway substantially along the length of the axis of the cylinder, the passageway having a front opening and a back opening such that during operation, the aqueous stream travels into the front opening, axially along the length of the cylinder, and out of the back opening; and
applying electric power to the plurality of capacitor pairs, wherein during the pumping step, pressure is applied that causes the aqueous stream travelling along the passageway to have a residence time of less than 2 seconds per 12 inches of length.

* * * * *